United States Patent [19]

Nissl

[11] 4,226,120

[45] Oct. 7, 1980

[54] ANALOG ACCELEROMETER

[75] Inventor: Norbert Nissl, Aresing, Fed. Rep. of Germany

[73] Assignee: Messerschmitt-Boelkow-Blohm Gesellschaft mit beschraenkter Haftung, Munich, Fed. Rep. of Germany

[21] Appl. No.: 952,653

[22] Filed: Oct. 19, 1978

[30] Foreign Application Priority Data

Oct. 27, 1977 [DE] Fed. Rep. of Germany ....... 2748173

[51] Int. Cl.³ ............................................. G01P 15/08
[52] U.S. Cl. .................................. 73/517 R; 350/285
[58] Field of Search ............ 73/517 R; 350/285, 96.10

[56] References Cited

U.S. PATENT DOCUMENTS

2,565,514  8/1951  Pajes .................................. 350/285
3,961,185  6/1976  Brokenshire et al. ............ 73/517 R

Primary Examiner—Jerry W. Myracle
Attorney, Agent, or Firm—W. G. Fasse; D. F. Gould

[57] ABSTRACT

The present accelerometer has an inertia mass and a measuring device for measuring a force acting on the inertia mass. The measuring device compares the intensity of light emanating from at least one optical fiber light source, with the light intensity entering at least one receiving optical fiber, after the light has been reflected, preferably repeatedly, in a gap formed by at least two reflecting surfaces. The gap is changeable by the force acting on the inertia mass. The acceleration to be measured may vary the gap width where the gap is formed between two parallel reflecting surfaces. Where the gap is formed by two surfaces including a gap defining angle, the acceleration to be measured may vary said gap defining angle.

18 Claims, 11 Drawing Figures

ANALOG ACCELEROMETER

BACKGROUND OF THE INVENTION

The invention relates to an accelerometer with an inertia mass and a device for measuring an acceleration force acting on the inertia mass.

The inertia mass in known accelerometers of this type affects a piezoelectric element when an acceleration force occurs. The piezoelectric load thus caused is measured and represents the acceleration force which occurred. Accelerometers of this type are used, for instance, in electric shell primers or fuses or intrigger circuits for retention systems in motor vehicles. Such retention systems comprise, for example, an air bag or seat belts. Usage in these fields depends essentially on a long range dependability. It has been shown, however, that conventional piezo-ceramics have an irregular and uncontrollable behavior due to temperature or aging influences. My previous U.S. Pat. No. 4,083,254 granted on Apr. 11, 1978 discloses an accelerometer which requires the use of an optical prism resulting in a very precise yet expensive instrument, so that there is room for improvement in simplifying the structure substantially without loss of precision.

OBJECTS OF THE INVENTION

In view of the foregoing it is the aim of the invention to achieve the following objects singly or in combination:

- to produce a low cost accelerometer, the behavior of which remains largely unaffected by temperature and aging influences;
- to produce an accelerometer wherein the change in intensity of light from a light source repeatedly reflected in a gap and entering a light receiving device is measured and the intensity change represents a measurement of the force acting on an inertia mass;
- to produce an accelerometer, wherein a differential light intensity signal is formed from two light output signals from the gap representing the force acting on an inertia mass so that the accelerometer is substantially not sensitive to maladjustments occurring during assembly;
- to provide the measuring device with a reference signal so that the measured output signal is independent of intensity variations of the light source;
- to provide an accelerometer wherein the inertia mass itself forms one of the reflecting components forming the gap;
- to provide an accelerometer which limits the vibrations of the inertia mass so that the deflection of the reflecting surface forming part of a spring elastic beam supported at one end is toward the other surface forming the gap; and
- to produce an accelerometer which is capable of measuring the size and the direction of an acceleration.

SUMMARY OF THE INVENTION

The analog accelerometer of the present invention comprises in a housing an inertia mass and a device for measuring the acceleration force acting on the inertia mass. The measuring device includes two reflecting surfaces forming a gap which is changeable by the force acting on the inertia mass. At least one output opening of a light source is arranged to supply light through light input means into the gap. At least one light output opening in the gap supplies light reflected in the gap into a light sensor such as a photocell whereby the intensity of the light emanating from the light source and reflected on the reflecting surfaces forming the gap is measurable for forming a measured signal representing the acceleration.

The gap may be altered in a practical manner which is both simple to execute and theoretically easy to determine, by varying the spacing between the reflecting surfaces by an acceleration force acting on the inertia mass. These reflecting surfaces may either be plane-parallel, or at least one of the surfaces may be spherical, or the reflecting surfaces may include a gap angle.

In the embodiment of the invention with an angle between the two reflecting surfaces such angle is changeable by the force acting on the inertia mass. The light from the light source is repeatedly reflected on these surfaces forming the gap. The number of reflections and the reflection angle measured relative to the reflecting surface of a light beam emanating from the light source at a given angle, are substantially a function of the enclosed gap angle. Since the intensity of the light is decreased with each reflection as determined by the reflection coefficient, the intensity of the light from the light source exiting at the gap ends changes with each change of the gap angle enclosed by the reflecting surfaces. Since, according to the invention, the enclosed gap angle is variable by a force acting on the inertia mass, the intensity of the light measured at the gap ends is a measure of the affecting force.

Furthermore, the difference between the intensities of light from a light source situated in the middle of the gap as measured at the narrow end and the wide end of the gap also changes with the enclosed gap angle. Hence, the apparatus for measuring the force acting on an inertia mass may also have an output of a light source arranged to supply light into the middle of the gap and a device arranged in the area of the narrow gap end and in the area of the wide gap end for measuring the intensity of the reflected light of the light source to form a differential signal.

An accelerometer according to the invention is particularly advantageous if it has a spring elastic beam clamped at one end, one side of which is formed as a reflecting surface and the opposite side of which is connected to the inertia mass. For this purpose, the actual mass of the spring support may represent the inertia mass. The enclosed gap angle of this apparatus may be changed in a simple manner by the action of a force on the inertia mass and hence by the elastic deflection of one end of the spring elastic beam.

The light emanating from the light source may be directed into the gap within a definite angular range and still provide for multiple reflections in the gap if the reflecting surfaces comprise a periodic arrangement of light absorbing surface portions or reflecting surface portions having different reflection coefficients. In this manner it is possible to amplify the intensity variation of the reflected and received light, said intensity variation having been caused by a change in the gap angle.

An analog measure of acceleration is obtained in a further advantageous manner, if one of the reflecting surfaces is supported by a spring element and is operatively connected to the inertia mass.

According to a further embodiment of the invention the output openings of at least three, preferably four light sources with different modulations or frequencies are arranged in the area of the gap formed by the reflecting surfaces. Thus, it is possible to measure the size and the direction of the acceleration acting on the present apparatus.

BRIEF FIGURE DESCRIPTION

In order that the invention may be clearly understood, it will now be described, by way of example, with reference to the accompanying drawings, wherein:

FIG. 2b shows the light intensity $J_2$ as a function of the gap width (d) in FIG. 2a;

FIG. 4b shows the sensitivity or response characteristic of the embodiment of FIG. 4a;

FIG. 5b shows the sensitivity or response characteristic of the embodiment of FIG. 5a;

Figure 6:
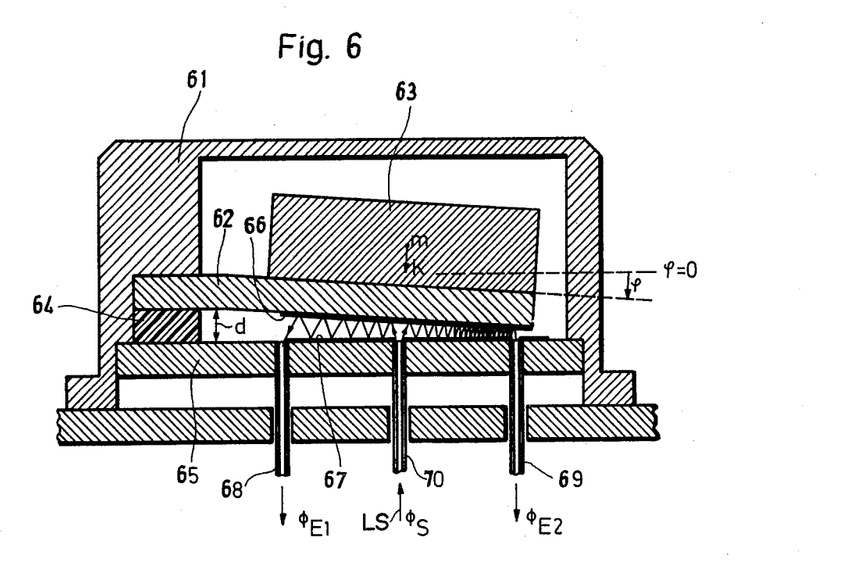
FIG. 6 shows schematically a sectional view through a further embodiment of an accelerometer of the invention with a spring elastic beam supported at one end.

DETAILED DESCRIPTION OF PREFERRED EXAMPLES SHOWING THE BEST MODE OF EMBODYING THIS INVENTION:

Referring first to FIG. 6 there is shown a spring elastic beam 62. An inertia mass 63 is mounted on the beam which is fitted into a housing 61 so that one end of the beam is clamped. The beam 62 is spaced from a flat base plate 65 by means of a synthetic spacing piece 64 so that at the clamped end of the beam 62 the base spacing "d" is provided between the plate 65 and the beam 62. The free end of the beam 62 includes an obtuse angle with its clamped end whereby the downwardly facing surface of the free end of the beam 62 confines one side of a wedge shaped volume having a wedge angle $\phi$.

The other side of the wedge shaped volume is confined by the upwardly facing surface of said plate 65. When the beam 62 with its mass 63 is subject to an inertia force K:

$$K = m \cdot b$$

where m = inertia mass and b = acceleration, the beam 62 is bent to form said wedge shaped volume. The mechanical dimensioning of the beam 62 and of the inertia mass 63 is chosen, so that the highest, significant frequency components of the acceleration to be measured still are well below the mechanical resonance frequency of the system comprising the beam 62 and the inertia mass 63. An advantageous embodiment of the beam 62 may have an areal moment of inertia which varies along the length of the beam 62, whereby the deflection $\Delta\phi$ of the beam 62 is restricted substantially to a narrow range.

Thus, the angular deflection $\Delta\phi$ remains small and within the validity range of Hooke's Law, whereby $\Delta\phi$ is directly proportional to the acting or effective inertia force K and hence to the acceleration b.

Figure 7:
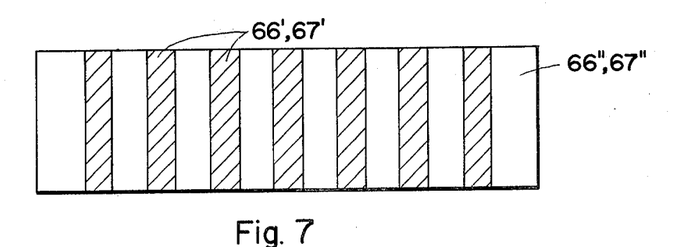
FIG. 7 shows a plan view of a surface having reflecting zones thereon.

The inwardly facing sides of the beam 62 and the flat base plate 65 facing the wedge shaped volume are polished and provided with mirror surfaces 66 and 67 respectively. This may be accomplished, for example, by means of a vapor deposited gold layer. For obtaining a suitable intensity distribution, definite absorption intervals 66' and 67' on the surfaces 66'' and 67'' or a reflection absorption pattern may be vapor deposited along the length of the surfaces forming the wedge shaped volume. The intensity variation of the received reflected light caused by the change in the wedge angle is amplified in this manner.

Three holes are bored into the flat base plate 65. Light fibers 68, 69 and 70 are fitted into these holes, so that an open end of each of the light fibers is oriented toward the wedge shaped volume.

The light flux $\phi_S$ from a light source LS, for example, a luminescent diode, is supplied to the middle light fiber 70. The light flux $\phi_S$ is then distributed in the wedge shaped volume according to the emission characteristic of the light fiber material used or according to the diffusion characteristic of a diffuser additionally located at the upper end of the light fiber 70 forming the input to the gap. The base spacing or distance "d"; the reflection factor "r" of the reflecting surfaces 66, 67; 66', 67', as well as the enclosed wedge angle "$\phi$" determine the distribution of the light intensity.

Both of the light output fibers 68 and 69 leading out of the gap are externally connected to respective optical receivers, for example, photocells or the like, not shown. The difference $\Delta\phi_E$ between the light fluxs $\phi_{E1}$, and $\phi_{E2}$ received from the two light fibers 68 and 69 is thus essentially a function of the difference of the mean value of the reflections taking place across all of the emission angles of the transmitting light fiber 70, since with each reflection the portion (1-r) of the intensity is absorbed by the reflecting surface, whereby "r" is an absorption factor. The use of this differential signal $\Delta\phi_E = \phi_{E1} - \phi_{E2}$ provides the advantage that the total arrangement is less sensitive to maladjustments occurring during the assembly of the accelerometer.

Figure 1:
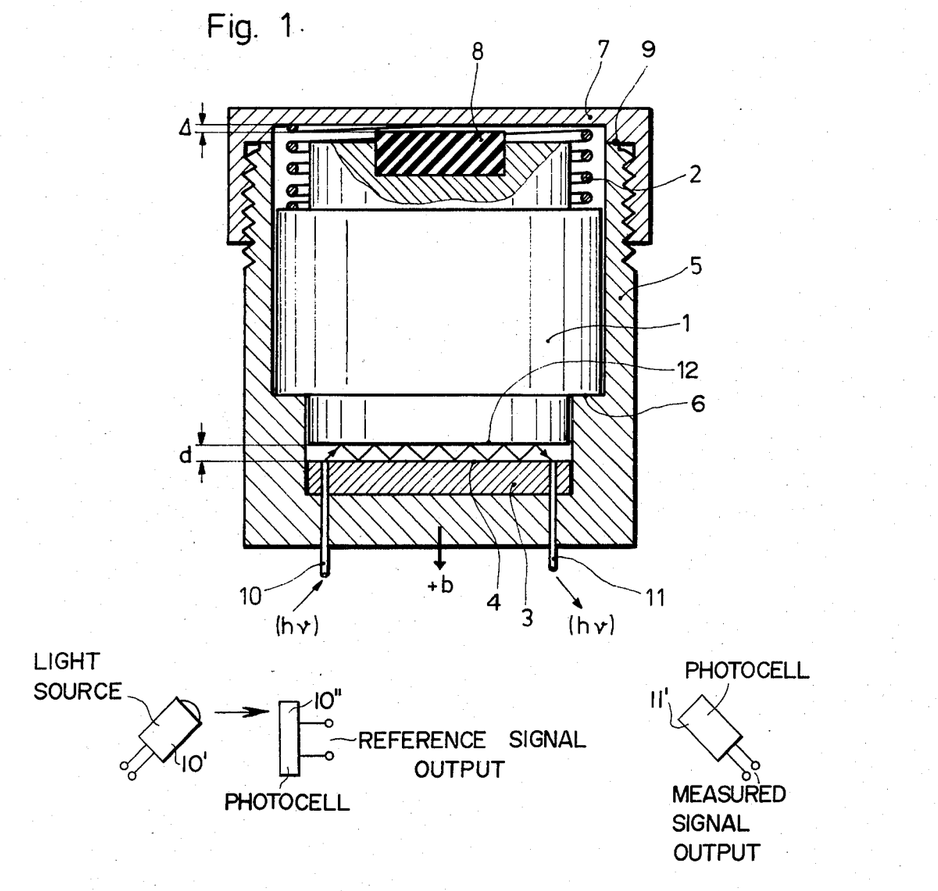
FIG. 1 shows a section through an accelerometer of the invention with a cylindrical inertia mass.

Inaccuracies due to variations in the intensity of the light source may be avoided in an advantageous manner if the measured signal at the output of the photocell 11' is compared with a reference signal derived from the light intensity of the light source 10' by means of a further photocell 10''. Such comparing results in a difference signal which is independent of the intensity of the light source at any given time and depends only on the gap width variation. This feature is applicable to all embodiments.

It has been found that an accelerometer according to the present invention has a sufficiently large linearity zone, for which the relationship $\Delta\phi_E \approx \Delta\phi \approx \Delta K$ applies, wherein $\Delta\phi$ is the variation of the wedge angle $\phi$ and $\Delta K$ is the variation of the inertia force.

The linearity also holds true, by the way, for the intensity measured at one receiving location:

$$\phi_{E1} \text{ or } E2 \approx \Delta\phi \approx \Delta K$$

Accordingly, the accelerometer could, if need be, function with only one received signal or only with one receiving location, for example, as shown in FIG. 1.

A particular advantage of this invention is the easy electrical impedance matching to available electronic circuits, simply by the appropriate choice of the photocells and the intensity of the light source $LS_1$.

The optical and mechanical elements used in the present accelerometer according to the invention are considerably less sensitive to aging and temperature variations than piezoelectric components. This property may be improved still further if materials are used which either compensate for the temperature expansion or which already have a temperature compensated elasticity modulus, and if the space enclosed by the housing 61 and the flux base plate 65 is filled with a protective, inert atmosphere, for example, with nitrogen.

Because of the simple construction of this accelerometer which comprises only a few components it may be easily miniaturized, thus making inexpensive series production possibe. FIG. 1 shows a further embodiment of an accelerometer with a cylindrical inertia mass 1 which is provided with a mirror or reflecting surface 12 on one facing side or end, e.g., by a metal vapor deposition. The inertia mass 1 is pressed against a defined seat 6 in the housing 5 by means of a spiral spring 2 as well as a screw top 7. The mirror surface 12 is thus maintained at a definite spacing "d" from the facing surface 4 of a disc 3 which is mounted in the housing 5, e.g., by an adhesive not shown. The facing surface 4 of the disc 3 is also provided with a mirror or reflecting surface. A damper cylinder 8 made of dampening material, for example, of silicon rubber, is embedded in the inertia mass 1. The cylinder 8 maintains a definite spacing $\Delta$ relative to the inner surface of the screw top 7. Additionally, the screw top 7 has a defined seat 9 on the housing 5 which defines the closest spacing. This arrangement causes the inertia mass 1 to press against the spiral spring 2 and to traverse a distance during an acceleration of the apparatus in the direction shown by the arrow b+, said traversed distance increasing the spacing "d". The incremental increase in the spacing "d" is proportional to the effective acceleration b if the load deflection curve of the spring 2 is linear. As soon as the spacing "d" has increased by the value of $\Delta$, a limiting and dampening effect is caused by the damper 8 contacting the inner surface of the screw cap 7 whereby an increase in the amplitude of high frequency vibrations is prevented. The value of $\Delta$ is adjusted according to the size of the inertia mass 1 and according to the spring constant of the spiral spring 2, so that the value $\Delta$ completely covers the acceleration range to be measured.

The evaluation of negative accelerations in the direction opposite to b+ is prevented because the inertia mass 1 contacts the seat 6 on the housing 5. Two light fibers 10 and 11 are secured in holes bored through the base of the housing 5 and through the disc 3. The optical facing ends of the two light fibers 10 and 11 are flush with the mirror like facing surface 4. If light from the source 10' and represented by (hv) in the drawings, is now beamed in modulated or unmodulated form into the light fiber 10 at an angle of approximately 45°, or at an angle within the range between 32° and 55° to the normal of the entry surface of the light fiber 10, then the light emanating from the light fiber 10 and entering into the gap between the facing surfaces 12 and 4 also has approximately the same angle shown as $\alpha$ in FIG. 2a.

The increase of the gap width "d" is modulated onto the light (hv) entering into the light fiber 11. The modulation is accomplished by a number "n" of reflections at the facing surfaces 12 and 4. These surfaces 12, 4 have a reflection coefficient $\zeta$, and the number "n" of reflections is inversely proportional to the gap width or spacing "d". Said modulation changes the light intensity in accordance with the gap width increase and hence represents the effective acceleration "b". By properly selecting the gap width "d", the gap length "S" (FIG. 2a) and the reflection coefficient $\zeta$ of the reflecting facing surfaces 12 and 4, a good linearity exists between the gap width "d" and the intensity $J_2$ of the reflected light at point B in FIG. 2a. This linearity is valid within the range in which $\Delta/d$ corresponds to 0 to 70% of the cap width. This linearity will now be proven in the following concrete sample calculation.

Figure 2A:
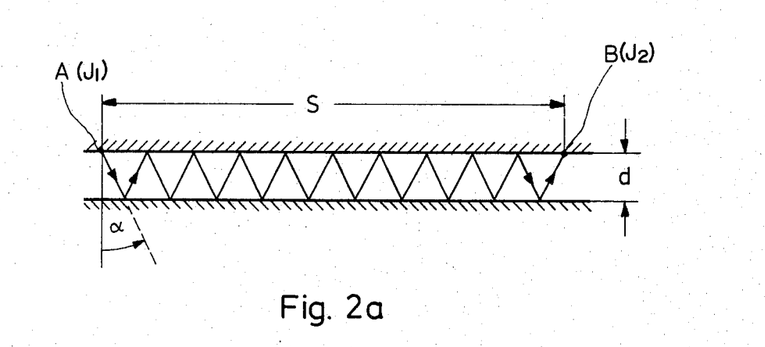
FIG. 2a shows schematically a beam of light multiply or repeatedly reflected in a gap.

FIG. 2a illustrates a gap having the width or spacing "d" and the length "S" wherein the number of reflections "n" for a beam of light entering from one side at A into the gap between two reflecting beam surfaces is:

$$n \approx S/(d \cdot \tan \alpha). \tag{1}$$

For a ray of light with the intensity $J_1$ entering at point A and with the intensity $J_2$ at the exit point B, the following approximation holds true:

$$J_2 \approx J_1 \cdot \rho^n = J_1 \cdot \rho^{\frac{S}{d \cdot \tan \alpha}} = J_1 \cdot \gamma^{\frac{1}{d}}, \tag{2}$$

where: $\rho$ is the reflection coefficient and $\gamma = S/\rho \tan \alpha$.

Figure 2B:
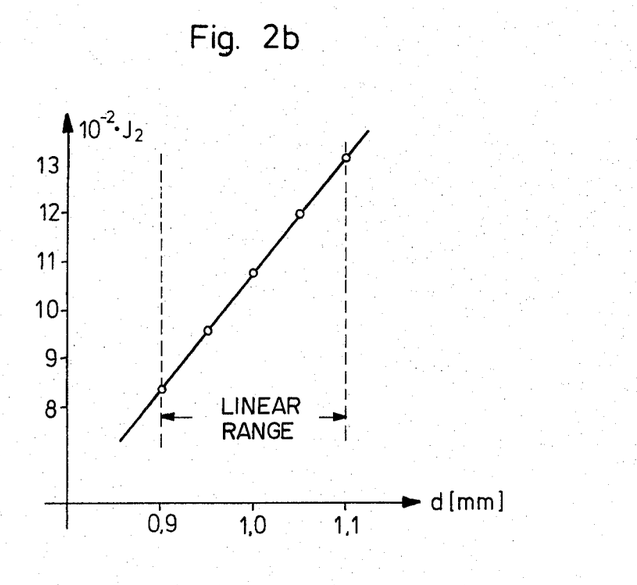

FIG. 2b shows that a sufficiently large linearity range between the gap width "d" and the intensity $J_2$ of the reflected light is attained, for example, with the following dimensioning: gap length s=10 mm, light entry angle $\alpha = 45°$ and the reflection coefficient $\rho = 0.8$. The linearity range for the spacing "d" may extend from about 0.9 to 1.1 mm if the intensity of the incident light is set at $J_1 = 1$.

However, in the example embodiment illustrated in FIG. 1 not only one light beam, but rather, a bundle of light beams emanates from the wave guide or light fiber 10 into the gap. The influence of such a bundle of light beams on the linearity of the accelerometer is examined with reference to FIGS. 3a and 3b.

Figure 3A:
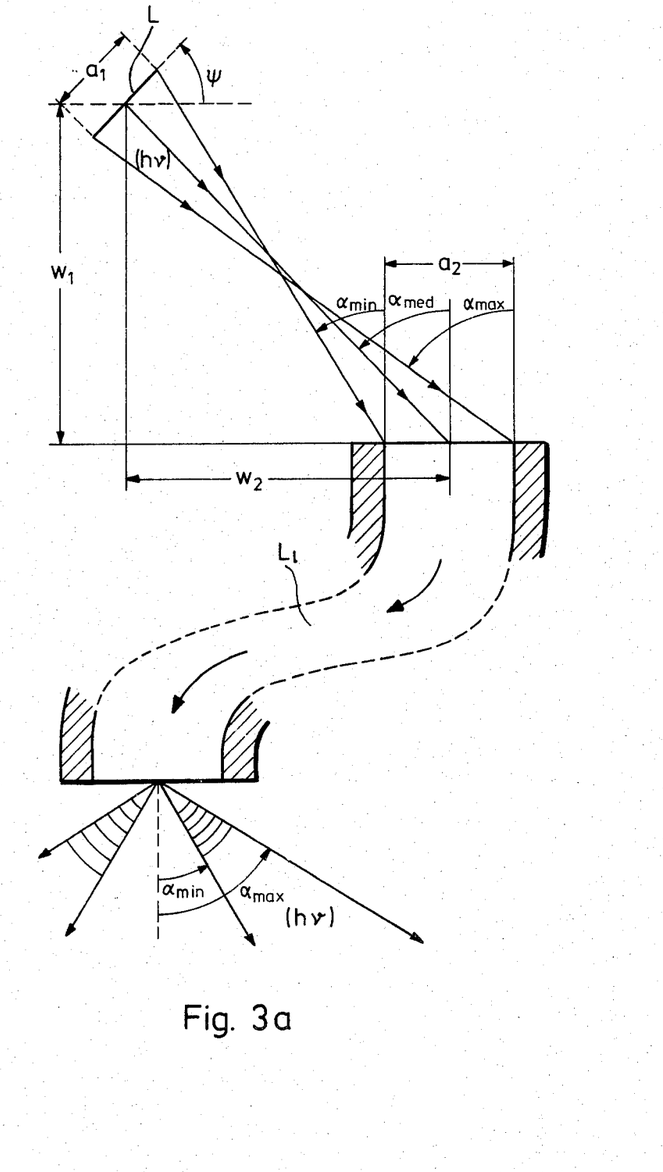
FIG. 3a shows schematically the reflection angle range of a light beam emanating from a light source and entering a light conducting fiber.

FIG. 3a shows schematically a light source L with the diameter $a_1$, the center of which has the spacing coordinates $w_1$ and $w_2$ from the center of the input opening of a light fiber $L_1$. The source L is inclined at an angle of $\psi$ relative to the horizontal. The input opening of the light fiber $L_1$ has a diameter $a_2$. The minimal, medium and maximal entrance angles of the bundle of light beams emanating from the light source L and entering into the fiber $L_1$ may be easily calculated from the geometry of the arrangement. For $\psi = 45°$, $w_1 = w_2 = 5$ mm, $a_1 = \sqrt{2}$ mm, and $a_2 = 2$ mm the following results are obtained:

for the minimum entrance angle $\alpha_{min} = 32.47°$,
for the medium entrance angle $\alpha_{med} = 45°$, and
for the maximum entrance angle $\alpha_{max} = 55.3°$.

Accordingly, the light emanates from the light fiber $L_1$ into an annular zone which is limited by the circular cones having the opening angles of $\alpha_{min}$ and $\alpha_{max}$.

Figure 3B:
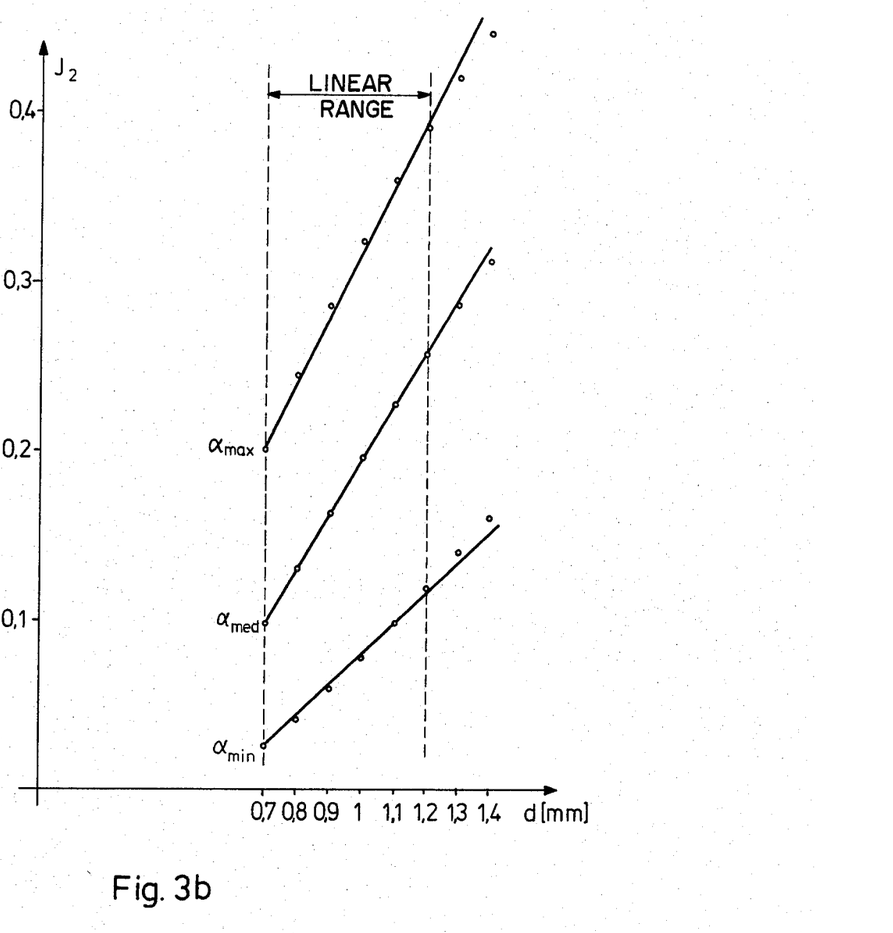
FIG. 3b shows the mathematical relations for the beam of light rays in FIG. 3a similarly as in FIG. 2b.

The intensity of such a bundle of light beams multiply or repeatedly reflected between two surfaces may now be calculated, according to equation (2) as a function of the distance "d" between the reflecting surfaces. The intensity $J_2$ of the reflected light is illustrated in FIG. 3b as a function of the spacing "d" between the reflecting surfaces for the minimum, medium, and maximum light entrance angles. The sample values used in FIGS. 2a and 2b are also used in FIG. 3b, however, with a higher reflection coefficient of $\rho=0.85$. FIG. 3b shows that for a gap width from 0.7 mm to 1.2 mm, the curves may be reproduced by straight lines within the angular range from $\alpha_{min}$ to $\alpha_{max}$ with only a slight error. Hence, the total intensity of the light is received also proportional to the spacing "d" and thus to the acceleration "b".

Figure 4A:
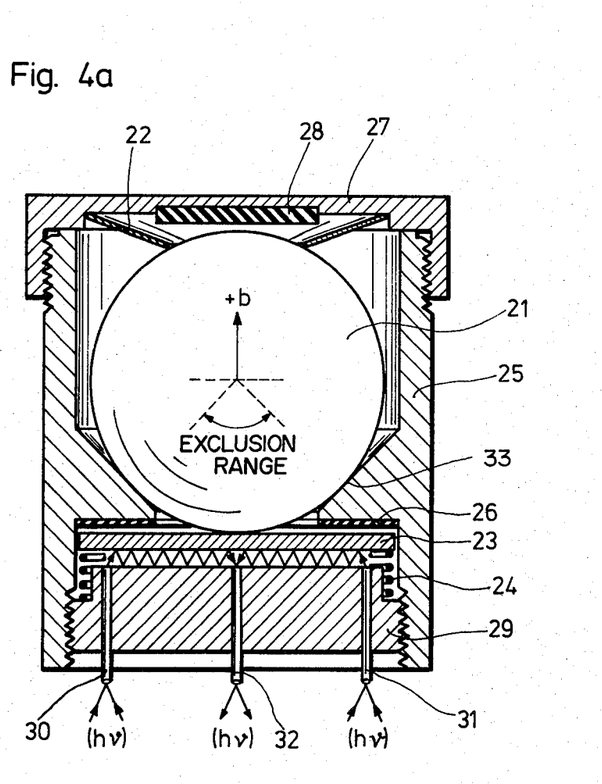
FIG. 4a shows a section through an accelerometer according to the invention with a spherical inertia mass.

FIG. 4a shows an accelerometer with a panoramic response characteristic. An inertia mass 21 in the shape of a ball is pressed against a defined cone shaped seat 33 in the housing 25 by means of a Belleville spring 22. A reflecting disc 23 is pressed against the ball 21 by means of a spiral spring 24, so that the reflecting disc 23 has a defined spacing from the ring 26 of dampening material which is glued against a seat in the housing 25. Another defined seat between the screw cap 27 on the housing 25 provides a defined spacing between the ball 21 and a disc 28 made of a dampening material glued into the screw cap 27. The dampening ring 26 and the dampening disc 28, limit the excursions of the ball and dampen oscillations when extreme accelerations occur. The elements 26, 28 may, for example, be made of silicone rubber.

If the inertia mass 21 under normal operating conditions is accelerated sideways or upwards relative to the housing 25, then the inertia mass 21 and the reflecting surface 23 move upwards toward the Belleville spring 22, whereby the gap between the reflecting disc 23 and the lower bottom 29 of the housing 25 becomes larger.

Since the ball 21 undergoes an upwardly directed as well as sideward movement in the instance of a lateral acceleration, small angular inclinations of the reflecting disc 23 occur, which would lead to a signal error. To compensate for such errors, four light emitting fibers 30 and 31 are inserted into the lower bottom 29 of the housing 25 in quadrant fashion, i.e., the light conducting and emitting fibers are spaced from each other by 90°. Only two light fibers are visible in the FIG. 4a. The light received by a centrally arranged receiving light fiber 32 is led to a photocell. Such errors are compensated by forming an average value of the received light intensities.

Figure 4B:
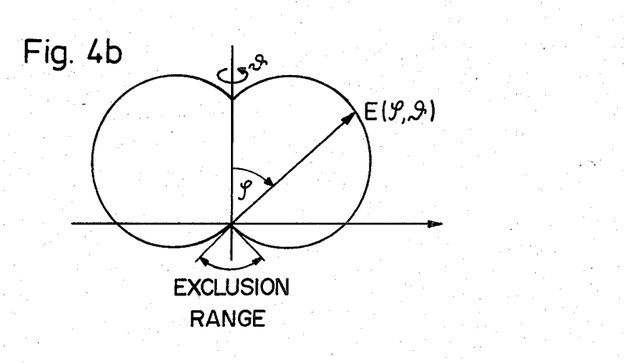

FIG. 4b illustrates the response characteristic for the example embodiment of FIG. 4a, $E=f(\phi,\nu)$ where $\phi$ and $\nu$ are the angular coordinates of the acceleration vector. The angle of the exclusion zone or range, in which the accelerometer does not respond, corresponds to the angle enclosed by the points of contact of the ball 21 with the cone shaped seat 33 and the center of the ball 21.

Figure 5A:
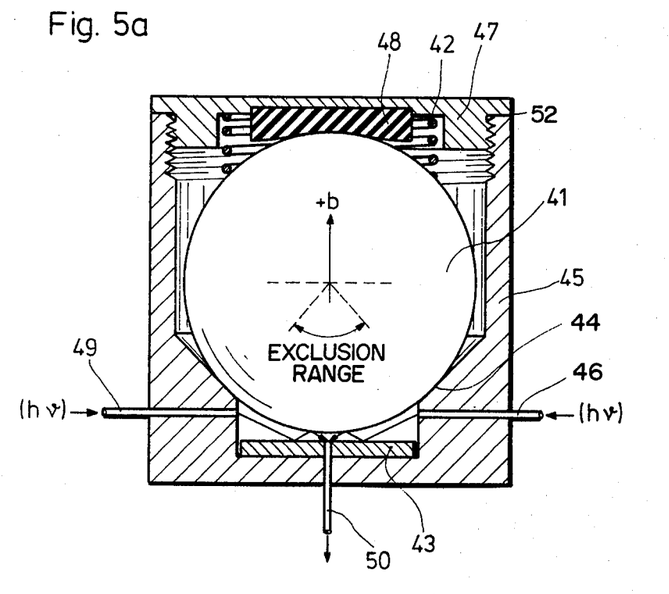
FIG. 5a shows a section through another embodiment of an accelerometer with a spherical inertia mass part of which forms a reflecting surface.
Figure 5B:
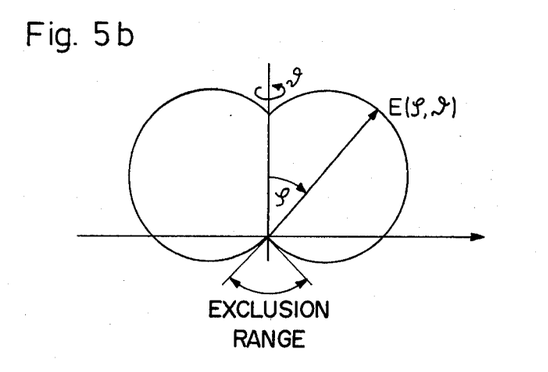

FIG. 5a illustrates an accelerometer wherein the hardened and polished surface of a ball 41 is used as a reflecting surface. The light $(h\nu)$ emanating from four light conducting fibers 46, 49 arranged in quadrant fashion, is multiply or repeatedly reflected in the gap between the outer surface of the ball 41 and the reflecting disc 43, and is received by a central receiving light fiber 50. FIG. 5b illustrates that the light intensity of this accelerometer does not vary linearly with the spacing between the outer surface of the ball 41 and the disc 43, but rather, rises more than linearly in the interesting spacing range shown in the figures, whereby distortions may occur. The ball 41, in order to compensate for these distortions, presses against a springy dampening disc 48 having a nonlinear characteristic and made, for example, of silicone rubber. This pressing is accomplished by means of the cap 47 screwed against a defined seat 52 on the housing 45. The disc 48 in cooperation with the linear characteristic curve of an appropriately dimensioned spiral spring 42, provides a defined pressing of the ball 41 against the conical seating surface 44 of the housing 45.

If the four light conducting and emitting fibers 46, 49 are supplied by the same light source, then distortions occur which are brough about by a lateral displacement of the ball. Such distortions are also compensated by producing a mean value as described above with reference to FIG. 4a. However, if the light from the four light conducting fibers 46, 49 is modulated differently or if different wavelengths of light are used, then the horizontal angle $\nu$ of the acceleration may be determined selectively. This is possible, since a horizontal acceleration not only causes the ball 41 to shift upwards, but also laterally on the surface of the conical seating 44. If, for example, the ball 41 moves toward the light fiber 49, then the light fiber 50 receives less light from the light fiber 49 than from the light fiber 46.

FIG. 5b illustrates the response or sensitivity characteristic of the embodiment of FIG. 5a which may be derived from a summation of the intensities of the four modulations or wavelengths. These different modulations or different wavelengths may be easily separated at the output of the receiving light fiber 50. In addition, information concerning the horizontal angle $\nu$ of the effective acceleration may also be derived from intensity distribution of the four modulations or wavelengths. This is of particular advantage if the accelerometer is to be used as an impact sensor in motor vehicles because the response features of retention systems may thus be more suitably adapted to different situations.

Although the invention has been described with reference to specific example embodiments, it is to be understood that it is intended to cover all modifications and equivalents within the scope of the appended claims.

What is claimed is:

1. An apparatus for measuring acceleration, comprising housing means, inertia mass means, spring means movably locating said inertia mass means in said housing means for responding to an acceleration force, force measuring means responsive to movements of said inertia mass means, said force measuring means comprising first and second light reflecting surface means arranged to form a gap of variable width between said first and second light reflecting surface means, at least one of said reflecting surface means being operatively associated with said inertia mass means so that said gap is varied in its width in response to said acceleration force acting on said inertia mass means; said apparatus further comprising light source means, light input means for introducing light from said light source means into said gap, light output means operatively connected to said gap, light receiving means arranged to exclusively receive light from said light output means after repeated reflections in said gap, whereby the change in intensity of the light emanating, after said repeated reflections, from said gap through said light output means and entering said light receiving means represents a measurement of said acceleration.

2. The apparatus of claim 1 wherein said reflecting surface means are normally plane-parallel relative to each other.

3. The apparatus of claim 1, wherein at least one of said reflecting surface means is spherical.

4. The apparatus of claim 1, wherein one of said reflecting surface means is operatively connected to said inertia mass means.

5. The apparatus of claim 4, further comprising spring means supporting said one reflecting surface means whereby the latter bears against said inertia mass.

6. The apparatus of claim 1, wherein said light input means comprise a plurality of light input members arranged to supply light into said gap from a corresponding plurality of directions, said light source means comprising a respective plurality of light source elements connected through said light input members to said gap.

7. The apparatus of claim 6, wherein each of said light source elements provides light of a different frequency.

8. The apparatus of claim 6, wherein each of said light source elements provides differently modulated light.

9. The apparatus of claim 1, wherein said first and second reflecting surface means include a gap angle to form said gap, whereby said gap has a wedge shape with a narrow end and a wide end, said gap angle being variable by said acceleration force acting on said inertia mass.

10. The apparatus of claim 9, wherein said light input means are arranged to introduce light centrally into said gap from said light source means and wherein said light receiving means comprise first and second light receiving members one of which is arranged at said narrow gap end and the other of which is arranged at said wide gap end, whereby a differential light intensity representing signal is formed.

11. The apparatus of claim 9 or 10, wherein said light receiving means comprise means for measuring the intensity of light emanating from said light source means for forming a reference signal.

12. The apparatus of claim 9, further comprising spring elastic beam means secured at one end thereof to said housing means and having a first side and a second side, wherein said first side of said spring elastic beam means forms one of said reflecting surfaces, and wherein said second side of said beam means is connected to said inertia mass means.

13. The apparatus of claim 12, wherein said spring elastic beam means and said inertia mass means form an integral structure.

14. The apparatus of claim 12, wherein said spring elastic beam means has an area moment of inertia which varies along the length of said spring elastic beam means.

15. The apparatus of claim 12, wherein said spring elastic beam means have a first end supported in said housing means and a second, free end which includes an obtuse angle with said first end so that said first side forming one of said reflective surfaces includes said gap angle with the other of said reflecting surfaces.

16. The apparatus of claim 9, wherein said reflecting surface means comprise periodically arranged light absorbing segments.

17. The apparatus of claim 16, wherein said light absorbing segments have different light reflection coefficients.

18. The apparatus of claim 1 or 9, further comprising dampening means for supporting one of said reflecting surface means.

* * * * *